No. 842,488. PATENTED JAN. 29, 1907.
J. H. O'DANIEL.
VEHICLE WHEEL.
APPLICATION FILED MAR. 26, 1906.
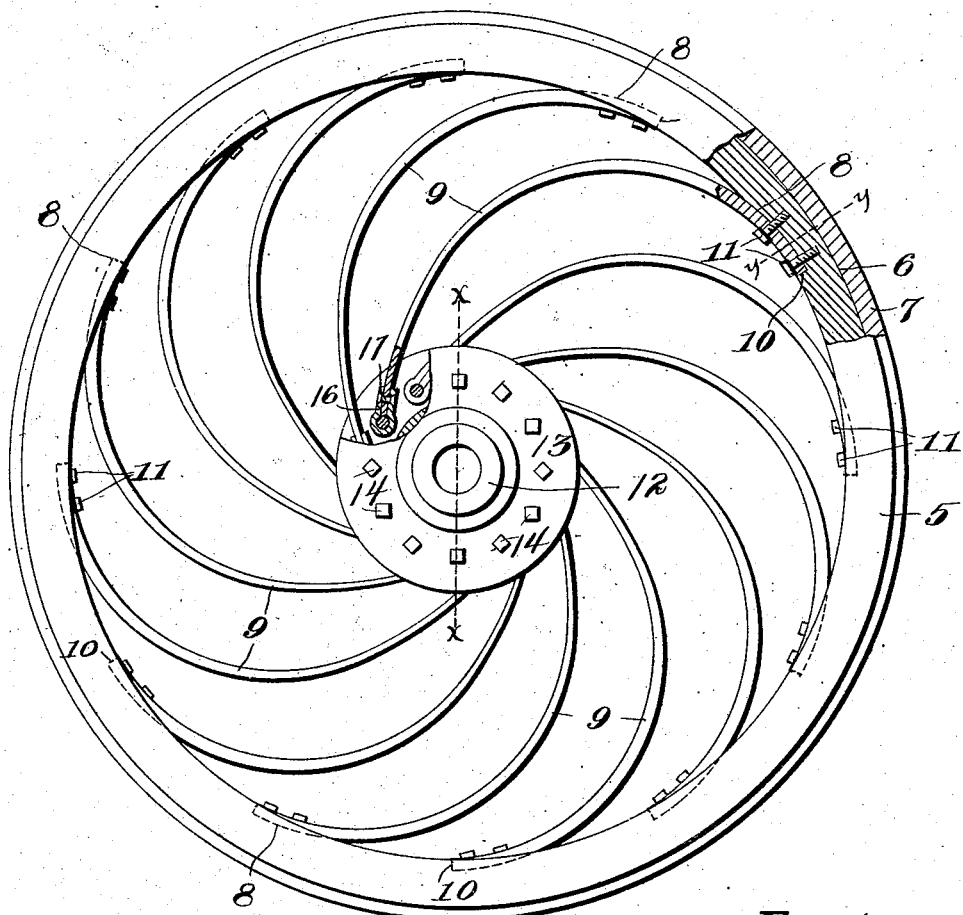
Fig. 1.
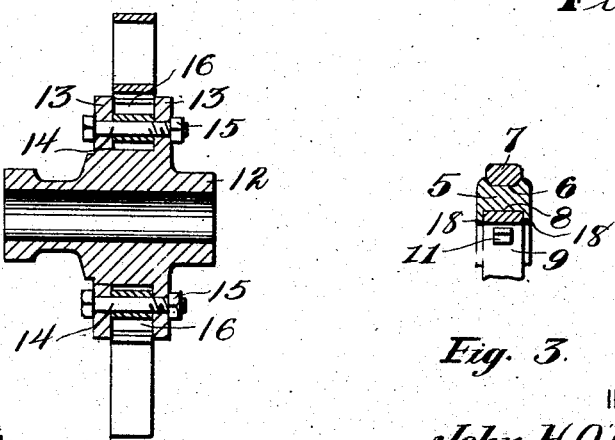
Fig. 2.
Fig. 3.
WITNESSES
Carl Stoughton
Frank G. Campbell
INVENTOR
John H. O'Daniel
BY
Shepherd & Parker
ATTORNEYS

UNITED STATES PATENT OFFICE.

JOHN H. O'DANIEL, OF COLUMBUS, OHIO.

VEHICLE-WHEEL.

No. 842,488.  Specification of Letters Patent.  Patented Jan. 29, 1907.

Application filed March 26, 1906. Serial No. 307,981.

*To all whom it may concern:*

Be it known that I, JOHN H. O'DANIEL, a citizen of the United States, residing at Columbus, in the county of Franklin and State of Ohio, have invented certain new and useful Improvements in Vehicle-Wheels, of which the following is a specification.

My invention relates to a wheel for vehicles, and has for its object the provision of a device of this character which will be durable and which will possess great resiliency without the employment of pneumatic tires.

It is a well-known fact that the liability of pneumatic tires to puncture causes much annoyance and delay and in some instances causes serious accidents.

It is a further object of the present invention to provide a wheel which will give when passing obstacles in a road-bed to as great or greater an extent than a wheel equipped with a pneumatic tire, while at the same time presenting a non-puncturable rim to the road-bed.

A further object of the invention is the provision of a wheel having a plurality of bowed resilient spring-steel spokes, the ends of which are connected to the rim and hub of the wheel in such manner as to permit the hub to give with relation to the rim.

Further objects and advantages of the invention will be set forth in the detailed description which now follows.

In the accompanying drawings, Figure 1 is a side elevation of a wheel constructed in accordance with the invention, with certain of the parts broken away to more clearly illustrate the construction thereof. Fig. 2 is a partial vertical section upon line $xx$ of Fig. 1, and Fig. 3 is a section through the rim of the wheel upon line $yy$ of Fig. 1.

Like numerals designate corresponding parts in all of the figures of the drawings.

Referring to the drawings, the numeral 5 designates the rim of the wheel, which may be grooved, as at 6, for the reception of any desired kind of tire 7. This tire may be formed of solid rubber or of wood or of metal to meet the requirements of the particular form of service to which the wheel is to be applied. The rim 5 is grooved, as at 8, for the reception of the outer ends of bowed resilient spring-steel spokes 9, the extreme ends of the spokes abutting against shoulders 10, formed at the ends of the recesses and being secured in said recesses by bolts or other fastening devices 11.

The hub 12 of the wheel is provided with a pair of annular flanges 13. Bolts 14 pass through these flanges and have nuts 15 threaded upon their ends. These bolts pass through U-shaped yokes 16, which are riveted, as at 17, upon the inner ends of the spokes 9. As is best illustrated in Fig. 1, these spokes are thicker at their outer ends than at their inner ends, and the inner ends of the spokes are secured tangentially in the hub. The yokes 16 are not clamped so firmly upon the bolts 14 as to cause said bolts to turn when said yokes move, as the spokes assume different positions under the stress of the load, but are pivoted upon said bolts. By virtue of this construction movement is permitted the inner ends of the spokes in the hub. It has been found that where spokes of this character have been rigidly secured within the hub the constant back-and-forth movement of the spokes at the point where they are gripped by the hub soon causes the spokes to break off. It will be seen by referring to Fig. 2 that the width of the spokes is substantially the width of the space between the flanges 13 and that the edges of said spokes have a bearing against the inner faces of said flanges. This braces the spokes laterally. The side walls 18 of the recesses 8 brace the outer ends of the spokes laterally. This bracing against lateral movement of the parts with relation to each other is an important feature of these devices, for it will be understood that in rounding curves sharply, where the tendency of the wheel is to skid, there is a tendency of the hub to move bodily sidewise with relation to the rim. The bracing of the parts provided by the flanges 13 and the walls of the recesses 18 effectually prevents said lateral movement, though leaving the parts perfectly free to move in the normal manner.

While the structure herein shown and described provides a resilient wheel to serve the purposes of the ordinary pneumatic tire, it possesses an equally important advantage by providing a structure which permits a limited rotative movement of the axle and hub with relation to the rim. When wheels of this character are used upon automobiles and the usual clutch mechanism between the engine and the driving-wheels is thrown into action, the hub may have a partial rotation with relation to the rim by virtue of the manner in which the inner ends of the spokes are pivoted in said hub. This initial movement of the hub of course places the spring-spokes under tension to a certain extent and results in the vehicle starting with a smooth gradual movement instead of with a jerk. It is the sudden jerk imparted to the driving mechanism upon starting a vehicle of this character that causes the breakage of the connections between the engine and the driving-wheels. This sudden starting of the machine also subjects the engine itself to severe strains. The gradual start rendered possible by the use of a wheel of this character prevents breakage of the axle, the sprockets, the driving-chains, or the stripping of gear-teeth in the transmission-gear. It likewise prevents breakage of the connecting-rods and relieves the engine itself of a large portion of the strain.

By referring to Fig. 2 of the drawings it will be seen that the left-hand flange 13 is separate from the hub 12. By virtue of this construction any wear upon the edges of the spokes 9 may be taken up by tightening the nuts 15. This is an important feature where almost constant movement of the inner ends of the spokes with relation to the inner faces of the flanges is present.

The wheel herein shown and described is constructed in such manner that one of the spokes thereof may be removed without disturbing any of the other spokes of the wheel. This renders it possible when the device is used for automobiles for the operator to insert a new spoke if one of the spokes of a wheel should become broken upon the road and without the aid of any tool other than an ordinary wrench.

The wheel herein shown and described provides a structure of great strength and is adapted for use upon any kind of vehicle. For light runabouts or buggies light springs will of course be used, while for automobiles or other heavy vehicles correspondingly heavy springs will be used. The resiliency of this wheel may be adjusted by varying the strength of the springs, as will be readily understood.

While the elements shown and described are well adapted to serve the purposes for which they are intended, it is to be understood that the invention is not limited to the precise construction set forth, but includes within its purview such changes as may be made within the scope of the appended claims.

What I claim is—

1. In a vehicle-wheel, the combination with a rim having a plurality of shallow recesses formed therein, a hub, a plurality of bowed spring-spokes the outer ends of which are thicker than the inner ends thereof, the inner ends of said spokes being pivoted tangentially in said hub and the outer ends of said spokes resting in the recesses of the rim, the extreme ends of the spokes resting against shoulders formed by the walls of the ends of the recesses.

2. In a vehicle-wheel, the combination with a rim having a plurality of shallow recesses formed therein, a hub, a plurality of bowed spring-spokes the outer ends of which are thicker than the inner ends thereof, the inner ends of said spokes being pivoted tangentially in said hub and the outer ends of said spokes resting in the recesses of the rim, the extreme ends of the spokes resting against shoulders formed by the walls of the ends of the recesses, the hub comprising a pair of upstanding flanges, and means for adjusting one of said flanges toward and from the other of said flanges.

In testimony whereof I affix my signature in presence of two witnesses.

JOHN H. O'DANIEL.

Witnesses:
 FRANK G. CAMPBELL,
 A. D. PHELPS.